United States Patent [19]
Paas

[11] Patent Number: 5,785,030
[45] Date of Patent: Jul. 28, 1998

[54] EXHAUST GAS RECIRCULATION IN INTERNAL COMBUSTION ENGINES

[75] Inventor: Norbert Paas, Louisville, Colo.

[73] Assignee: Dry Systems Technologies, Louisville, Colo.

[21] Appl. No.: 768,985

[22] Filed: Dec. 17, 1996

[51] Int. Cl.⁶ .................... F02M 25/07; F01N 3/02
[52] U.S. Cl. .................. 60/278; 123/570; 60/605.2
[58] Field of Search ................... 123/568, 569, 123/570, 25 B, 25 E; 60/278, 279, 605.2

[56] References Cited

U.S. PATENT DOCUMENTS

| | | | |
|---|---|---|---|
| 2,977,940 | 4/1961 | Theriault | 123/570 |
| 3,779,013 | 12/1973 | Faber et al. | 60/278 |
| 3,779,213 | 12/1973 | Knudsen | 123/1 R |
| 3,786,635 | 1/1974 | Kates et al. | 123/570 |
| 3,831,377 | 8/1974 | Morin | 123/570 |
| 4,011,845 | 3/1977 | Mayer et al. | 123/570 |
| 4,323,045 | 4/1982 | Yamashita | 123/570 |
| 4,356,806 | 11/1982 | Freesh | 123/570 |
| 4,503,813 | 3/1985 | Lindberg | 123/25 B |
| 4,506,505 | 3/1985 | Melzer | 60/278 |
| 4,674,463 | 6/1987 | Duckworth et al. | 123/570 |
| 4,696,279 | 9/1987 | Lindberg | 123/570 |
| 4,735,186 | 4/1988 | Parsons | 123/570 |
| 4,958,490 | 9/1990 | Harjunpää | 60/274 |
| 5,085,049 | 2/1992 | Rim et al. | 60/278 |
| 5,272,874 | 12/1993 | Paas | 60/297 |
| 5,431,706 | 7/1995 | Paas | 55/342 |
| 5,488,826 | 2/1996 | Paas | 60/299 |
| 5,601,068 | 2/1997 | Nozaki | 123/569 |

FOREIGN PATENT DOCUMENTS 176312  10/1982  Japan ..................... 123/570

Primary Examiner—Willis R. Wolfe
Attorney, Agent, or Firm—Bruce E. Dahl; Klaas, Law, O'Meara & Malkin

[57] ABSTRACT

An exhaust gas recirculation system for an internal combustion engine may comprise an EGR valve having an inlet end connected to the exhaust manifold of the engine and an outlet end connected to the inlet end of a heat exchanger. The outlet end of the heat exchanger is in turn connected to the inlet end of a filter assembly, the outlet end of which is connected to the intake manifold of the engine. A valve control system connected to the EGR valve selectively opens and closes the valve to direct cooled and filtered exhaust gases into the intake manifold of the engine. An intermittent water injection system may be connected to the inlet end of the heat exchanger and may be used to inject a predetermined quantity of water into the inlet of the heat exchanger at periodic intervals to remove accumulated soot deposits from the interior surfaces of the heat exchanger.

16 Claims, 4 Drawing Sheets

EXHAUST GAS RECIRCULATION IN INTERNAL COMBUSTION ENGINES

FIELD OF THE INVENTION

This invention relates to emissions control systems for internal combustion engines in general and more specifically to exhaust gas recirculation systems for diesel engines.

BACKGROUND

One problem associated with the use of internal combustion engines, such as gasoline engines and diesel engines, arises from the formation of various compounds of gaseous nitrogen oxides ($NO_x$), such as nitric oxide (NO), nitrous oxide ($NO_2$), etc., during the combustion process. As is well-known, the presence in the exhaust gases of such compounds contributes significantly to the unhealthful emissions produced by such engines. Generally speaking, the quantity of nitrogen oxides produced by the engine is related to the combustion temperature as well as to the oxygen content of the combustion gas. The formation of nitrogen oxides is also related to some degree to the peak combustion pressure.

One method for reducing the amount of gaseous nitrogen oxides in the exhaust gas is to lower the combustion temperature by injecting water into the combustion chamber. While such water injection systems have been used with some degree of success, they are no panacea. For example, water injection systems can be expensive to install and often require special maintenance procedures to keep them operating at top efficiency. Another problem associated with water injection is that while the injection of water into the combustion chamber reduces the overall combustion temperature, it also tends to increase the overall combustion pressure, which can lead to the formation of additional nitrogen oxides which, of course, partially offsets the nitrogen oxide reduction achieved by the lower combustion temperatures. Further, the injected water may also lead to the formation of sulfuric acid ($H_2SO_4$) if the fuel contains an appreciable amount of sulfur, as is the case with many diesel fuels.

Another method for reducing the nitrogen oxide content of the exhaust gases has been to recirculate a portion of the exhaust gases into the intake manifold. The recirculated exhaust gas mixes with the intake air charge, reducing its total oxygen content, which, of course, means that less oxygen is available during combustion to form nitrogen oxides. Such exhaust gas recirculation (EGR) systems have proven to be very effective when used with conventional spark ignition or gasoline engines. Indeed, EGR systems are widely used in cars and trucks having gasoline engines.

Unfortunately, however, it has proven considerably more difficult to incorporate such EGR systems on compression ignition or diesel engines. One of the most significant problems has to do with the various particulate compounds that are found in diesel engine exhaust which are not present in the exhaust from gasoline engines.

Generally speaking, the solid particulate matter (i.e., soot) in diesel engine exhaust comprises small, solid, irregularly shaped particles, which are themselves agglomerates of smaller particles. The solid particulate matter may often have high molecular weight hydrocarbons absorbed on their surfaces. Frequently, the particulate matter is a complex mixture of pure carbon and various kinds of organic materials, and the sizes may range from very small particles of about 0.01 microns to relatively large clusters having sizes in the range of 10–30 microns, giving the particulate an extremely fine and light, flour-like consistency. Turbo-supercharged diesel engines tend to emit more of the smaller particles with much lower levels of retained organic compounds.

However, regardless of the composition of the particulate matter, it tends to impose significant difficulties on the successful use of an EGR system. For example, the particulate matter tends to accumulate on nearly every surface with which it comes into contact and can accumulate within the EGR valve, causing premature wear or even failure of the valve. The particulate matter also tends to accumulate on the inside surfaces of the intake manifold and intake valves, which may hamper engine performance and increase intake valve wear. The presence of the particulate matter in the intake charge can also increase wear on the cylinders, pistons, and rings.

While it is theoretically possible to lower the nitrogen oxide emissions ($NO_x$) of diesel engines by using EGR systems, it has proven considerably more difficult to design an EGR system that is effective from a practical standpoint. That is, most EGR systems used on diesel engines tend to require excessive maintenance, frequent cleaning, or worse, may shorten the life of the engine. Therefore, most EGR systems for diesel engines have never enjoyed wide-spread use.

Consequently, a need exists for an EGR system that can be effectively used on diesel engines. The EGR system should result in a significant reduction in nitrogen oxide emissions, yet without requiring excessive maintenance or frequent cleaning of the various components of the EGR system. Other advantages could be realized if such an EGR system would reduce the amount of soot build-up in the intake system of the engine, thus extending the life of the engine when compared to conventional EGR systems.

SUMMARY OF THE INVENTION

An exhaust gas recirculation system for an internal combustion engine may comprise an EGR valve having an inlet end connected to the exhaust manifold of the engine and an outlet end connected to the inlet end of a heat exchanger. The outlet end of the heat exchanger is in turn connected to the inlet end of a filter assembly, the outlet end of which is connected to the intake manifold of the engine. A valve control system connected to the EGR valve selectively opens and closes the valve to direct cooled and filtered exhaust gases into the intake manifold of the engine. An intermittent water injection system may be connected to the inlet end of the heat exchanger and may be used to inject a predetermined quantity of water into the inlet of the heat exchanger at periodic intervals to remove accumulated soot deposits from the interior surfaces of the heat exchanger.

Also disclosed is a method for recirculating exhaust gases produced by an internal combustion engine that comprises the steps of first drawing from the exhaust manifold an amount of exhaust gases to be recirculated and then cooling the exhaust gases in a heat exchanger. The cooled exhaust gases are then filtered to remove solid particulate matter entrained therein and directed into the intake manifold.

BREIF DESCRIPTION OF THE DRAWINGS

Illustrative and presently preferred embodiments of the invention are shown in the accompanying drawings in which.

DETAILED DESCRIPTION OF THE INVENTION

Figure 1:
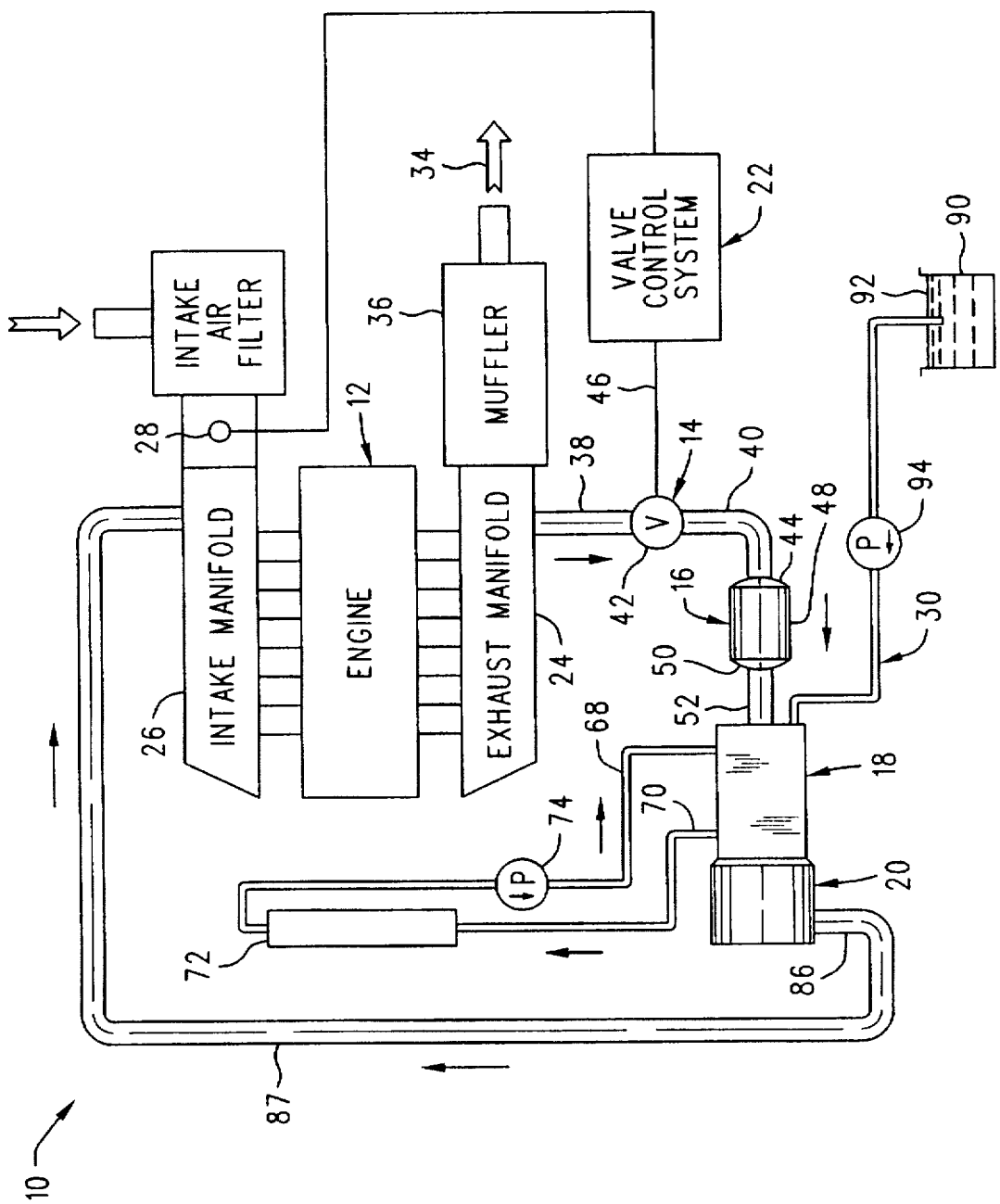
FIG. 1 is a schematic view of one embodiment of the exhaust gas recirculation system according to the present invention.

An exhaust gas recirculation (EGR) system 10 according to the present invention is shown in FIG. 1 as it may be used with a normally aspirated (i.e., non-supercharged) diesel engine 12 of the type commonly used in a wide range of vehicles and applications. Essentially, the EGR system 10 first cools the exhaust gas to be recirculated, then filters it, thereby substantially eliminating the problems associated with recirculating to the intake manifold hot, particulate-laden diesel exhaust gases.

Figure 5:
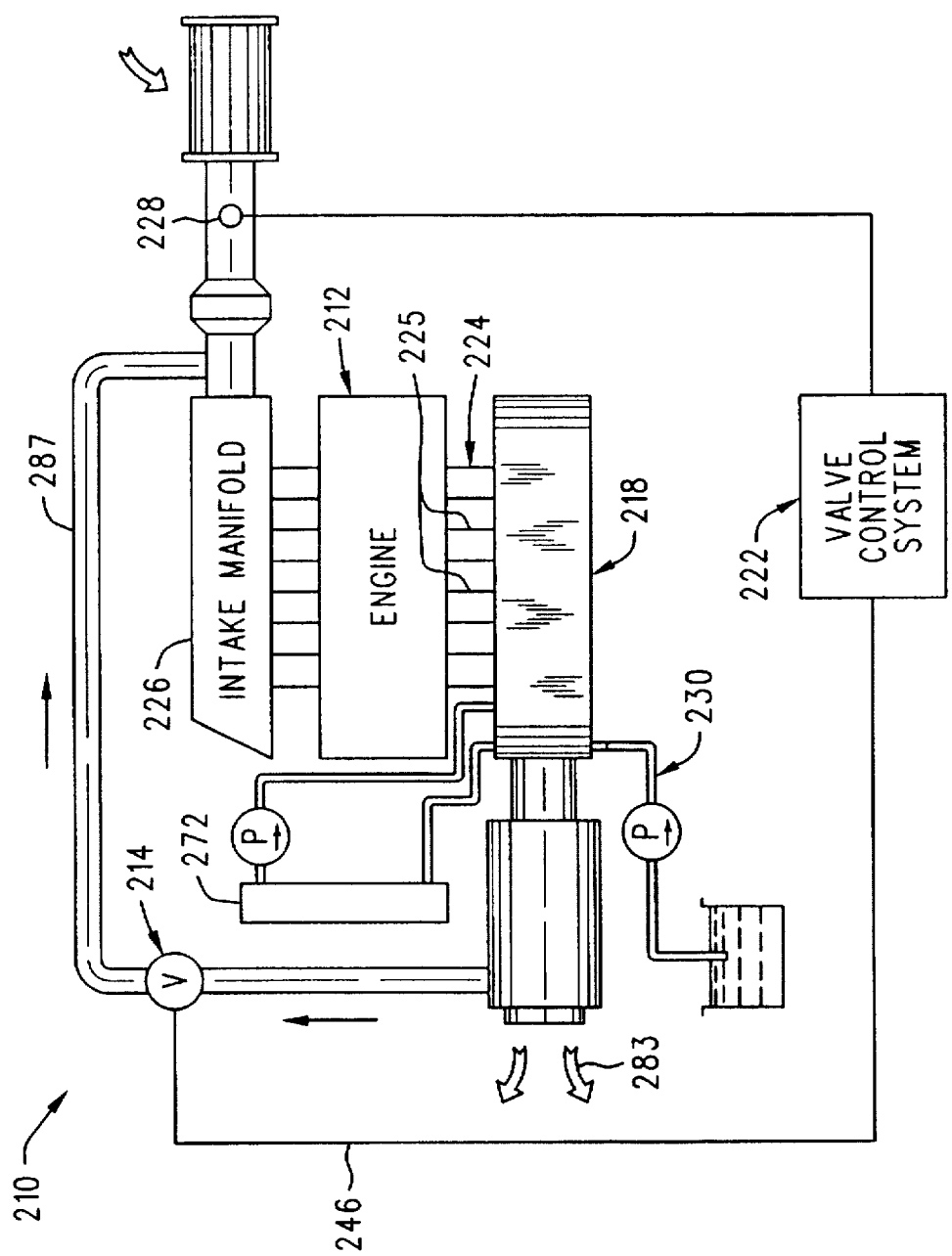
FIG. 5 is a schematic view of a third embodiment of the exhaust gas recirculation system as it could be used with an exhaust treatment system of the type suitable for use in underground mines having explosive atmospheres.

In one preferred embodiment, the exhaust gas recirculation (EGR) system 10 comprises an EGR valve assembly 14, a catalyst assembly 16, a heat exchanger assembly 18, a filter assembly 20, and a valve control system 22. The arrangement is such that the EGR valve assembly 14 is connected to the exhaust manifold 24 of the engine 12, while the catalyst, heat exchanger, and filter assemblies 16, 18, and 20, respectively, are located at sequential downstream locations from the EGR valve assembly 14. Alternatively, the EGR valve assembly may be connected between the filter assembly and the intake manifold as best seen in FIG. 5. The EGR valve assembly 14 may be operated (i.e., opened and closed) by a valve control system 22 which, in one preferred embodiment, is connected to the throttle valve assembly 28 of the engine 12. The valve control system 22 is designed to open the EGR valve assembly 14 when the engine 12 is operated at about half (i.e., 50%) throttle.

The EGR system 10 may optionally include a catalyst assembly 16 to reduce by some degree the amount of particulate matter entering the respective heat exchanger and filter assemblies 18 and 20. The optional catalyst assembly 16 may include a catalyst bed that comprises any of a wide range of catalysts suitable for use with diesel engines, e.g., platinum, palladium, etc. Alternatively, other catalyst materials could also be used, as would be obvious to persons having ordinary skill in the art. While the primary function of the catalyst assembly 16 is to reduce the quantity of particulate matter entering the heat exchanger and filter assemblies 18 and 20, it is also effective in reducing the quantities of unburned hydrocarbons and carbon monoxide as well.

The heat exchanger assembly 18 is connected to the catalyst assembly 16 and cools the exhaust gases from relatively high temperatures in the range of about 1200° F. to 1500° F. to lower temperatures preferably not exceeding about 300° F. The use of the heat exchanger assembly 18 to lower the temperature of the recirculated exhaust gases thereby allows a relatively inexpensive disposable paper filter element 32 (FIG. 3) to be used to remove the particulate matter from the exhaust gases. The relatively cool recirculated exhaust gases also reduce the temperature increase of the overall intake air charge when compared with conventional EGR systems that do not cool the exhaust gases. Of course, the cooler intake air charge allows for increased engine performance during those times when exhaust gases are being recirculated. In one preferred embodiment, the heat exchanger assembly 18 also includes an intermittent water injection system 30 for periodically removing soot accumulations from the interior surfaces of the heat exchanger 18 to maintain peak thermal efficiency.

Figure 3:
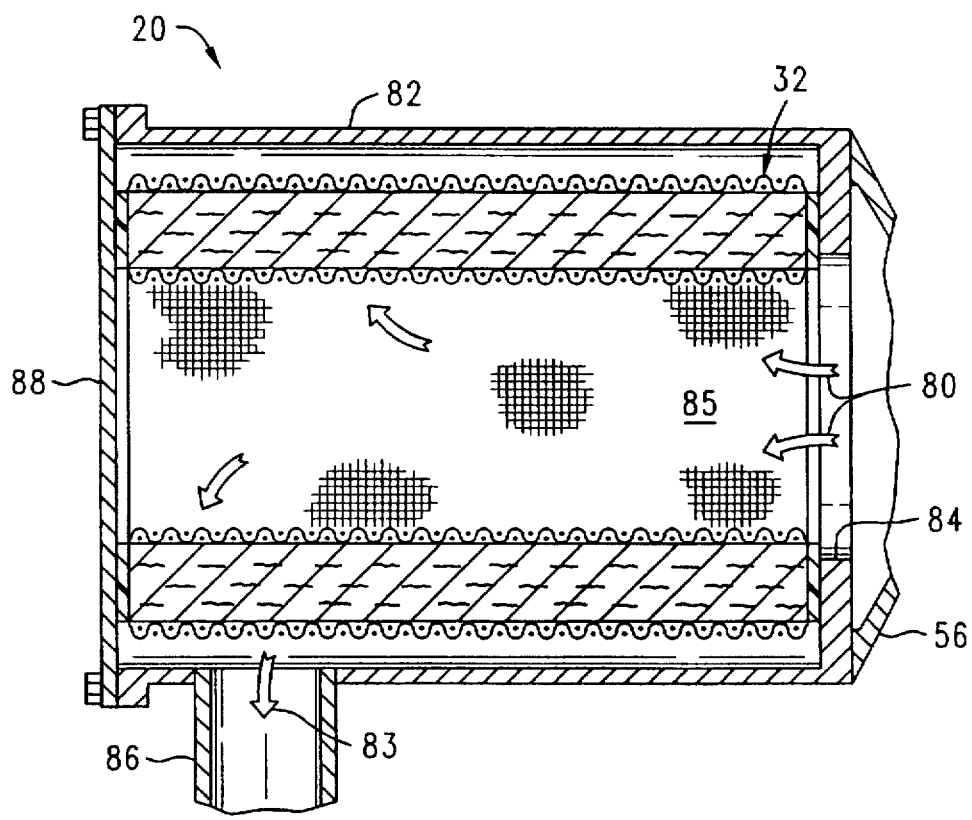
FIG. 3 is a cross-section view in elevation of the filter assembly.

The filter assembly 20 is connected to the heat exchanger assembly 18 and to the intake manifold 26 in the manner best seen in FIG. 1. In one embodiment, the filter assembly 20 includes a disposable low-temperature filter element 32 (FIG. 3). The filter element 32 removes substantially all of the remaining solid particulate matter from the catalyzed and cooled exhaust gases 80 (FIG. 3). The cooled and filtered exhaust gases 83 (FIG. 3) exit the filter assembly 20 and are directed into the intake manifold 26, whereupon they are mixed with the intake air charge.

The EGR system 10 operates as follows. When the engine 12 is under light load, e.g., operating at less than about half (i.e., 50%) throttle, the valve control system 22 maintains the EGR valve assembly 14 in the closed position and all of the exhaust gases 34 exit the exhaust manifold 24 via the muffler assembly 36. That is, no exhaust gas is recirculated. However, when the engine 12 is operating above about half throttle, the valve control system 22 opens EGR valve assembly 14. The open EGR valve 14 allows a portion of the exhaust gases 34 contained within the exhaust manifold 24 to be directed to the intake manifold 26 via the various components comprising the EGR system 10.

First, the exhaust gases to be recirculated pass through the catalyst assembly 16. Catalyst assembly 16 catalyzes the exhaust gases 34 by burning (i.e., oxidizing) a portion of the unburned hydrocarbon compounds. The burning of the unburned hydrocarbon compounds also has the effect of reducing to some degree the quantity of solid particulate matter contained within the exhaust gases. The catalyst assembly 16 also oxidizes a portion of the carbon monoxide (CO) gas to form carbon dioxide gas ($CO_2$). Of course, the heat liberated by the oxidation reactions occurring in the catalyst assembly 16 also tends to increase the temperature of the exhaust gases. For example, in one preferred embodiment the temperatures of the catalyzed exhaust gases are in the range of about 1200° F. to 1500° F.

The catalyzed exhaust gases 76 (FIG. 2) from the catalyst assembly 16 next enter the heat exchanger assembly 18. The main purpose of the heat exchanger 18 is to lower the temperature of the exhaust gases so that a relatively inexpensive paper filter element 32 can be used to filter the solid particulate matter from the exhaust gases. In one preferred embodiment, the heat exchanger assembly 18 cools the catalyzed exhaust gases 76 down to temperatures generally not exceeding about 300° F. The cooled and catalyzed exhaust gases 80 next pass into the filter assembly 20 which removes substantially all of the particulate matter from the exhaust gases. The filtered exhaust gases 83 are then directed to the intake manifold 26 where they are mixed with the intake charge and drawn into the cylinders.

Occasionally during EGR operation it will be necessary to clean the accumulated soot from internal surfaces of the heat exchanger assembly 18. In one preferred embodiment, the accumulated soot may be removed by activating the intermittent water injection system 30. Essentially, the intermittent water injection system 30 removes the soot deposits by injecting a small quantity of water 98 (FIG. 2) into the hot, catalyzed exhaust gases 76 entering the heat exchanger 18. Upon contact with the hot catalyzed exhaust gases 76, the water 98 nearly instantaneously flashes to steam. The steam rapidly expands, creating a pressure pulse that dislodges the accumulated soot from the inside surfaces of the cooling tubes 58 and carries it to the filter assembly 20 whereupon it is removed from the exhaust gases.

A significant advantage of the EGR system 10 is that it allows for the practical implementation of EGR in diesel engines or any other type of engine that produces relatively large amounts of particulate matter in the exhaust gases. The filter assembly 20 removes a substantial quantity of the solid particulate matter from the exhaust gas to be recirculated, thus avoiding problems associated with soot build-up in the engine intake system, i.e., intake manifold and valves. The filtered recirculated exhaust gases also reduce wear on the cylinders, pistons, and rings.

Yet another advantage of the EGR system 10 is that the temperature of the recirculated exhaust gases is considerably lower than is the case in conventional EGR systems wherein the recirculated exhaust gases are not cooled. The relatively cool recirculated exhaust gases allow a relatively inexpensive paper filter element to be used. The cool recirculated exhaust gases also prevent them from excessively increasing the overall temperature of the intake air charge, thereby increasing engine performance.

Still other advantages are associated with the intermittent water injection system 30. For example, the water injection system 30 provides for an effective and convenient way to clean the internal surfaces of the heat exchanger 18 without having to shut-down the system and disassemble the heat exchanger 18 for cleaning.

Having briefly described the EGR system 10, along with some of its more significant features and advantages, the various embodiments of the EGR system according to the present invention will now be described in detail. Referring back now to FIG. 1, one embodiment 10 of the EGR system according to the present invention is shown as it could be used in conjunction with a normally aspirated, i.e., non-supercharged, diesel engine 12 of the type well-known in the art. It should be understood that the particular engine and engine application are not critical in achieving the objects of the invention. Indeed, the EGR system 10 according to the present invention can be used on a wide variety of engine types and sizes and involved in any of a wide range of applications, such as automotive, trucking, marine, and power generation, just to name a few.

Essentially, the EGR system 10 comprises an EGR valve assembly 14, a catalyst assembly 16, a heat exchanger assembly 18, and a filter assembly 20. The EGR system 10 also includes a valve control system 22 for controlling the operation of the EGR valve assembly 14 and may optionally include an intermittent water injection system 30 for periodically cleaning the heat exchanger assembly 18 to maintain peak thermal efficiency.

The EGR valve assembly 14 may comprise a conventional EGR valve 42, such as a poppet valve, having an inlet end 38 and an outlet end 40. The inlet end 38 of poppet valve 42 is connected to the exhaust manifold 24, while the outlet end 40 is connected to the inlet end 44 of catalyst assembly 16. The poppet valve 42 is designed so that it can be opened and closed in response to a valve control signal 46 produced by the valve control system 22. In one preferred embodiment, the EGR valve assembly 14 comprises a model no. 7.21999.00.0 EGR valve, available from Pierburg, GMBH of Neuss, Germany. Alternatively, the EGR valve assembly 14 may comprise any other of a wide range of EGR valves that are readily commercially available.

The valve control system 22 may take on any of a wide variety of forms depending on the particular EGR valve 42 selected, as well as on the particular engine 12. For example, if the EGR valve 42 comprises a hydraulically actuated valve, then the valve control system 22 should comprise a hydraulic actuator system suitable for operating the hydraulic valve 42. Similarly, if the EGR valve 42 comprises a pneumatically operated valve, then the valve control system 22 should provide a pneumatic signal suitable for operating the valve. In any event, the valve control system 22 should be responsive to the position of the throttle of the engine so that the EGR valve assembly 14 can be opened and closed depending on the position of the engine throttle (not shown). Alternatively, the valve control system could be connected to other engine control systems (e.g., a fuel control unit (not shown) or an electronic engine controller (not shown)), and made responsive to either throttle position, manifold pressure, engine speed, or any other parameter or combination of parameters that are commonly used to determine suitable opening points for EGR valves.

In one preferred embodiment, the valve control system 22 is connected to the throttle body 28 associated with the intake manifold 26 and is designed or "programmed" so that it will open the EGR valve assembly 14 when the engine 12 is operated at and above about half throttle (i.e., 50%). It should be noted, however, that the exact throttle position at which the valve control system opens the EGR valve assembly 14 is not critical. Indeed, the particular engine, installation, and/or emissions requirements may dictate that the valve control system 22 be designed or programmed to open the EGR valve assembly 14 at throttle angles other than 50%. Therefore, the present invention should not be regarded as being limited to any particular EGR valve/throttle position schedule.

By way of example, the valve control system 22 used in one preferred embodiment comprises a model no. M71–100 valve control system available from Paas Technologies, Inc., of Louisville, Colo. 80027, although any of a wide range of valve control devices and systems may be used as well.

As was already mentioned, it is preferred, but not required, that the EGR assembly 10 include a catalyst assembly 16 to catalyze the exhaust gases to be recirculated. The main advantage associated with the use of a catalyst assembly 16 is that the catalyst bed (not shown) contained therein reduces to some extent the amount of particulate matter contained within the recirculated exhaust gases. The catalyst assembly 16 also reduces the quantity of unburned hydrocarbons and carbon monoxide in the exhaust gases as well.

Essentially then, the catalyst assembly 16 may comprise any of a wide range of catalyst assemblies commonly used with diesel engines, the selection of which would be obvious to persons having ordinary skill in the art depending on the particular engine and/or application. For example, one such catalyst assembly may comprise a generally cylindrically shaped external housing 48 having an inlet end 44 and an outlet end 50. The inlet end 44 is connected to the outlet end 40 of valve assembly 14, while the outlet end 50 is connected to the inlet end 52 of the heat exchanger assembly 18. The external housing 48 is adapted to receive a catalyst bed (not shown) containing a catalyst material, such as platinum, palladium, rhodium, etc., suitable for catalyzing the exhaust gases 34 from the engine 12. By way of example, one preferred embodiment uses a catalyst assembly available from Syncat of Louisville, as model no. S08.

Figure 2:
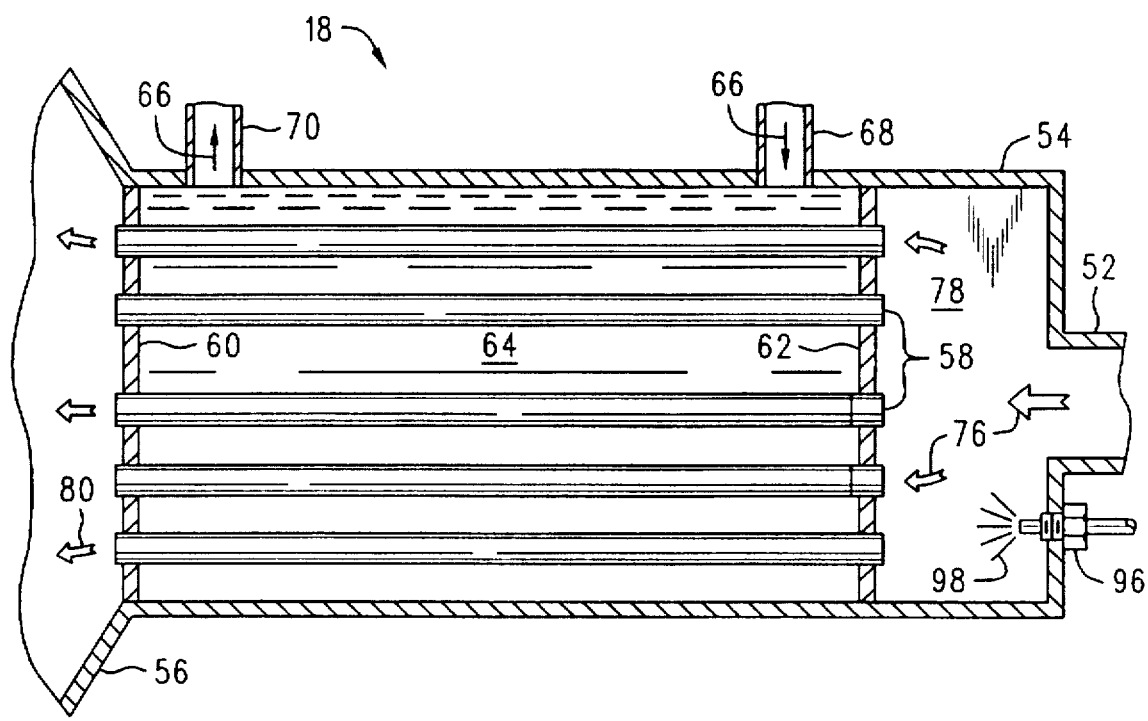
FIG. 2 is a cross-section view in elevation of the heat exchanger assembly.

The details of the heat exchanger assembly 18 are best seen in FIG. 2. Essentially, the heat exchanger assembly 18 comprises a housing 54 having an inlet end 52 and an outlet end 56. The housing 54 is adapted to receive a plurality of cooling tubes 58 mounted between a pair of bulkheads 60, 62. The bulkheads 60, 62 and the housing 54 define a water chamber 64. Cooling water, indicated by arrows 66, enters the chamber 64 through a water inlet 68 and exits the chamber 64 through an outlet 70. The cooling water may be cooled by an external radiator 72 and circulated by a cooling pump 74, as best seen in FIG. 1. The external radiator 72 and pump 74 may comprise separate components or may comprise the engine coolant radiator and engine water pump (not shown), as would be obvious to persons having ordinary skill in the art.

In operation, then, the hot, catalyzed exhaust gases 76 pass from the inlet plenum 78, through the cooling tubes 58, where they are cooled, and emerge into the outlet end 56 as cooled exhaust gases 80. The thermal capacity of the heat exchanger assembly 18 should, of course, be consistent with the volume of exhaust gases to be recirculated as well as on the maximum allowable temperature of the cooled exhaust gases 80 entering the filter assembly 20. As was described above, the heat exchanger 18 in one preferred embodiment is of sufficient capacity to cool the hot, catalyzed exhaust gases 76 from temperatures in the range of about 1200° F. to 1500° F. down to temperatures preferably not exceeding about 300° F.

It is preferred, but not required, that the heat exchanger assembly 18 include an intermittent water injection system 30 for periodically removing the accumulated soot (not shown) from the inside surfaces of the cooling tubes 58 to maintain peak thermal efficiency. As was described above, the solid particulate matter contained within the exhaust gases 34 from the diesel engine 12 tends to accumulate on nearly every surface with which it comes in contact, including the inside surfaces of the cooling tubes 58. Since excessive soot accumulation can seriously affect the heat transfer (i.e., thermal) efficiency of the heat exchanger 18, the intermittent water injection system 30 is utilized to provide a means for periodically removing the accumulated soot from the inside surfaces of the cooling tubes 58.

Referring now to FIGS. 1 and 2 simultaneously, the intermittent water injection system 30 may comprise a reservoir 90 for containing a supply of water 92. A pump 94 connected between the reservoir 90 and an injection nozzle 96 (FIG. 2) may be used to inject a fine spray 98 of water 92 into the inlet plenum 78 of the heat exchanger assembly 18. In one preferred embodiment, the pump 94 may comprise a small displacement piston pump which may be actuated by a handle (not shown) to pump a small quantity of water (e.g., about 1 oz.) through the nozzle 96. However, the particular type of pump used is not critical and it should be noted that a wide variety of other types of pumps could also be used without departing from the scope of this invention. For example, the pump 94 could be automatically actuated by a pneumatic or hydraulic actuating system, which could either be manually or automatically triggered.

As will be described in greater detail below, upon contact with the hot, catalyzed exhaust gases 76, the fine spray 98 of water nearly instantaneously flashes to steam (not shown) which rapidly expands, creating a pressure pulse which travels through the cooling tubes 58 and forcibly dislodges and blows out the accumulated soot from the inside surfaces of the various cooling tubes 58. The dislodged soot is carried downstream whereupon it is captured by the filter assembly 20.

The filter assembly 20 is best seen in FIG. 3 and may comprise a generally cylindrically shaped housing 82 having an inlet end 84 and an outlet end 86. The inlet end 84 is attached to the outlet end 56 of heat exchanger assembly 18, whereas the outlet end 86 is attached to the intake manifold 26 via a suitable pipe 87. See FIG. 1. The housing 82 is open at one end and is adapted to receive a generally cylindrically shaped filter element 32. The open end may be covered by an end plate 88. When the filter element 32 becomes clogged, the end plate 88 can be removed and the old filter withdrawn from the housing 82. A new filter element may then be inserted in its place and the end plate 88 replaced.

Advantageously, the water cooled heat exchanger 18 allows a relatively inexpensive disposable filter element 32 to be used. While a wide variety of filters are commercially available and could be used, depending, of course, upon the maximum expected temperature of the cooled exhaust gases 80, one preferred embodiment utilizes a disposable paper filter available from Dry Systems Technologies of Louisville, Colo. 80027.

The EGR system 10 may be operated so that a portion of the exhaust gases 34 from the engine 12 are recirculated to the intake manifold 26 when the engine 12 is operated under load and/or at high speed. For example, the valve control system 22 associated with one preferred embodiment of the invention is designed or "programmed" to open the valve assembly 14 when the engine 12 is operated at about half throttle. The valve assembly 14 remains closed if the engine 12 is idling or operating below about half throttle. When the valve 14 is open, a small quantity of the exhaust gases 34 contained within the exhaust manifold 24 are drawn off to be recirculated to the intake manifold 26. The exhaust gases 34 first pass through the valve 14 and catalyst assembly 16. The catalyst bed (not shown) contained within the housing 48 of catalyst assembly 16 further burns or oxidizes the exhaust gases 34 which reduces the quantities of unburned hydrocarbons and solid particulate matter entrained therein. The catalyst bed (not shown) contained within the catalyst assembly 16 also oxidizes carbon monoxide (CO) to carbon dioxide ($CO_2$). Of course, the supplemental oxidization of the exhaust gases 34 passing through the catalyst assembly 16 liberates additional heat which increases the temperature of the catalyzed exhaust gases 76.

The hot, catalyzed exhaust gases 76 from the catalyst assembly 16 next enter the inlet plenum 78 of the heat exchanger 18. Referring now to FIG. 2, the catalyzed exhaust gases 76 pass through the various cooling tubes 58 in the heat exchanger 18, whereupon they are cooled by the water (represented by arrows 66) circulating through the water chamber 64. The degree of cooling achieved by the heat exchanger assembly 18 should be sufficient so that the cooled and catalyzed exhaust gases 80 leaving the heat exchanger 18 are sufficiently cool to avoid igniting the filter element 32 contained within the filter assembly 20. In one preferred embodiment which utilizes a disposable paper filter element 32, the temperature of the cooled exhaust gases 80 should not exceed about 300° F. It should be noted, however, that the maximum temperature of the cooled exhaust gases 80 may be higher or lower than 300° F. depending on the maximum temperature that can be tolerated by the filter element 32. Consequently, the cooled exhaust gases 80 should not be regarded as being limited to any particular temperature or range of temperatures.

Referring now to FIG. 3, the cooled exhaust gases 80 from the heat exchanger assembly 18 enter the filter assembly 20, which removes substantially all of the remaining solid particulate matter entrained in the exhaust gases 80. Specifically, the cooled exhaust gases 80 enter the center portion 85 of the housing 82 of the filter assembly 20, pass through the filter element 32, and exit through the outlet 86. The cooled and filtered exhaust gases 83 are then directed to the intake manifold 26 via pipe 87 (FIG. 1), whereupon they are mixed with the incoming intake air charge.

In one preferred embodiment, it is desirable to use the water injection system 30 to periodically clean out the cooling tubes 58 contained within the heat exchanger assembly 18. The cleaning operation is best carried out by first increasing the speed of the engine 12 to near maximum rated rpm to ensure a high exhaust gas flow rate through the EGR system 10. The operator (not shown) may then actuate the pump 94 to inject a small spray 98 of water 92 into the inlet plenum 78 of the heat exchanger assembly 18. The injected water 92 very nearly instantaneously flashes to steam which rapidly expands and creates a pressure pulse that travels down the cooling tubes 58. The pressure pulse forcibly dislodges and blows out the accumulated soot from the inside surfaces of the cooling tubes 58. The dislodged soot is then carried downstream to the filter assembly 20 where it is trapped by filter element 32.

Depending on the capacity of the filter element 32 it may be necessary to replace the element with a new element after performing the cleaning process. However, if the capacity of the filter element 32 is relatively high, then several cleaning operations may be accomplished before the need arises to change the filter element 32.

Figure 4:
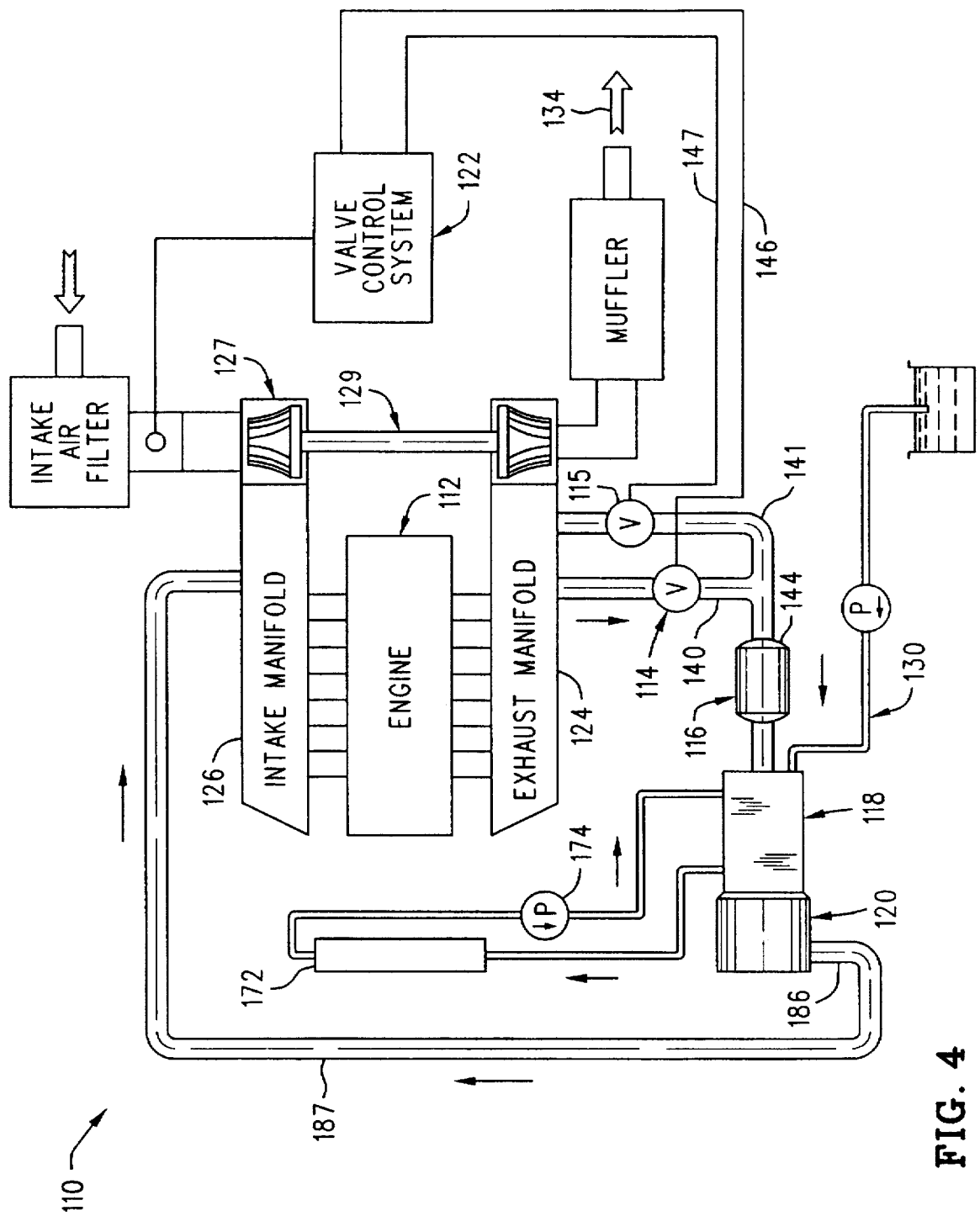
FIG. 4 is a schematic view of a second embodiment of the exhaust gas recirculation system as it could be used with a turbo-supercharged engine.

Another embodiment 110 of the EGR system according to the present invention is shown in FIG. 4 as it could be used in conjunction with a diesel engine 112 equipped with a turbo-supercharger 129. Unlike the first embodiment 10, the second embodiment 110 of the EGR system includes a pair of EGR valves 114, 115 that are connected in parallel. Each valve 114, 115 is independently controlled by the valve control system 122. In one preferred embodiment, the first valve 114 is opened at about half throttle while the second valve 115 is opened at about 75% throttle. Therefore, the dual valve arrangement is capable of providing increased exhaust gas recirculation at higher engine speeds.

Referring now to FIG. 4, the inlet end 138, 139 of each respective valve assembly 114, 115 is connected to the exhaust manifold 124, whereas the respective outlet ends 140 and 141 are connected to the inlet end 144 of the catalyst assembly 116. Each valve assembly 114, 115 is connected to the valve control system 122 and is independently actuated by respective valve control signals 146, 147. In one preferred embodiment, each valve assembly 114, 115 may be identical and may comprise a poppet valve of the type already mentioned.

The valve control system 122 is also connected to the throttle body 128 can be essentially identical to the valve control system 22 for the first embodiment 10 shown in FIG. 1, except that it should be designed to provide two valve control signals 146, 147. In one preferred embodiment, the valve control system 122 is designed or "programmed" to open the first valve assembly 114 at about half throttle (i.e., 50%) and to open the second valve assembly 115 at about three quarters (i.e., 75%) throttle. The opening of the second valve assembly 115 therefore allows additional exhaust gas 134 to be recirculated during heavy load and/or high speed operation.

The use of two EGR valves (e.g., 114, 115) connected in parallel provides a convenient means for increasing the amount of exhaust being recirculated at large throttle openings, which may be desirable in certain applications or for certain engines. However, the use of two valves is not required, and the present invention should not be regarded as limited to the parallel valve arrangement. Indeed, certain engines, applications, or desired emissions specifications may make it desirable to use a single EGR valve (e.g., 14) as shown in FIG. 1.

Still referring to FIG. 4, the EGR system 110 may include an optional catalyst assembly 116 connected to the outlet ends 140, 141 of the respective valve assemblies 114, 115 to reduce the quantity of solid particulate matter contained within the recirculated exhaust gas. The catalyst assembly 116 may be identical to the catalyst assembly 16 used in the first embodiment 10, recognizing that it may need to be of slightly larger capacity to accommodate the increased exhaust gas flow resulting from the use of the parallel valve assemblies 114, 115.

As was the case for the first embodiment 10, the second embodiment 110 also includes a heat exchanger 118 and a filter assembly 120 connected at respective downstream locations from the catalyst assembly 116. Here again, the heat exchanger assembly 118 and filter assembly 120 may be identical to the heat exchanger 18 and filter assembly 20 shown and described for the first embodiment 10. Of course, it may be necessary or desirable to increase the capacities of these respective components to accommodate the increased exhaust gas flow resulting from the parallel valve arrangement. The outlet 186 of the filter assembly 120 is connected to the intake system by a suitable hose or pipe 187, preferably at a point upstream of the compressor section 127 of the turbo-supercharger assembly 129.

The heat exchanger assembly 118 may be cooled by a supply of cooling water (not shown) circulated through a radiator 172 by a suitable pump assembly 174. Alternatively, however, other types of cooling systems could be used, as would be obvious to persons having ordinary skill in the art. The heat exchanger assembly 118 may also include an intermittent water injection system 130 for periodically cleaning the accumulated soot from the inside surfaces of the heat exchanger assembly 118 in the manner already described.

The operation of the second embodiment 110 of the EGR system according to the present invention is essentially identical to the first embodiment 10. However, in addition to the first valve 114 opening at about 50% throttle, the valve control system will also open the second valve 115 when the throttle is opened to about 75%, thereby increasing the amount of exhaust gas recirculated to the intake manifold 126. As was noted above, the particular opening points of the valve assemblies 114, 115 could be different depending on the particular engine, installation, and emissions specifications. Therefore, the present invention should not be regarded as limited to the specific valve opening points described herein.

A third embodiment 210 of the EGR system according to the present invention is shown in FIG. 5 as it could be used on an engine 212 equipped with an exhaust treatment system of the type disclosed in my U.S. Pat. No. 5,272,874, which is commonly owned and is specifically incorporated herein by this reference for all that it discloses. Essentially, the exhaust gas treatment system disclosed in that patent includes a relatively large heat exchanger assembly 218 having sufficient capacity to cool all of the exhaust gases produced by the engine 212. Similarly, a large capacity filter assembly 220 is connected to the heat exchanger assembly 218 and includes a filter element (not shown in FIG. 5) having sufficient capacity to handle the entire exhaust gas flow from the engine 212. The filter element utilized in the filter assembly 220 may be of the type disclosed in the aforementioned U.S. Pat. No. 5,272,874. Alternatively, the filter assembly may be of the type disclosed in my U.S. Pat. No. 5,431,706, which is also commonly owned and is specifically incorporated herein for all that it discloses.

The third embodiment of the EGR system 210 may include a single EGR valve assembly 214 connected to the filter assembly 220 so that a quantity of the cooled, filtered exhaust gases 283 may be recirculated to the intake manifold 226 via pipe 287. Alternatively, a pair of EGR valves connected in parallel may be used in the manner already described for the second embodiment 110 shown in FIG. 4. In any event, the EGR valve assembly 214 may comprise any of a wide range of EGR valves readily commercially available and having sufficient capacity to recirculate the quantity of exhaust gas required by the particular engine or installation and to meet the desired emissions specifications. In one preferred embodiment, the EGR valve assembly 214 may comprise a poppet valve assembly manufactured by Pierburg, GMBH of Neuss, Germany and identified as model no. 7.21999.00.0.

The valve control system 222 may be essentially identical to the valve control systems 22 and 122 shown and described above for the other embodiments. That is, the valve control system 222 should be connected to or associated with the throttle body assembly 228 so that it can produce a valve actuation signal 246 suitable for opening the EGR valve assembly 214 when the throttle is opened by the desired amount. In one preferred embodiment, the valve control system 222 is programmed to open the EGR valve assembly 214 at about half (i.e., 50%) throttle, although other throttle angles may also be used without departing from the scope of the present invention.

The heat exchanger assembly 218 is similar to the heat exchangers 18 and 118 shown and described above, except that the heat exchanger assembly 218 is considerably larger since it must handle all of the exhaust gases produced by the engine 212. In the embodiment shown in FIG. 5, the heat exchanger assembly 218 may be essentially identical to the heat exchanger assembly shown and described in U.S. Pat. No. 5,272,874. As was the case for the other embodiments, an intermittent water injection system 230 is employed as a means for periodically removing the accumulated soot from the inside surfaces of the cooling tubes (e.g., 58, FIG. 2) contained within the heat exchanger assembly 218. The intermittent water injection system 230 may be essentially identical to the intermittent water injection system 30 shown and described above, thus will not be described in further detail.

The exhaust treatment system shown in FIG. 5 and disclosed in U.S. Pat. No. 5,272,874 also includes a plurality of catalyst assemblies (not shown) that, in one embodiment, are positioned within the various branches, e.g., 225, of the exhaust manifold 224. Alternatively, a water cooled catalyst assembly of the type shown and described in my U.S. Pat. No. 5,488,826, which is commonly owned and specifically incorporated herein by reference for all that it discloses, may also be used.

The operation of the third embodiment 210 of the EGR system according to the present invention is essentially the same as for the other embodiments. That is, the valve control system 222 generates a valve actuation signal 246 when the engine 212 is operated at or above about half throttle. When the valve assembly 214 is opened, a portion of the cooled, filtered exhaust gas 283 from the filter assembly 220 is drawn into the intake manifold 226 via pipe 287. The remainder of the cooled and filtered exhaust gas 283 exits the filter assembly 220 into the surrounding atmosphere.

This completes the detailed description of the various embodiments of the EGR system according to the present invention. While a number of specific components were described above for the preferred embodiments of this invention, persons having ordinary skill in this art will readily recognize that other substitute components or combinations of components may be available now or in the future to accomplish comparable functions to the apparatus described herein. For example, while the present invention was shown and described herein as it could be used with diesel engines, it could just as easily be adapted for use with any other type of internal combustion engine where it would be desirable to reduce $NO_x$ emissions by recirculating a portion of the exhaust gases to the intake manifold. Still other modifications are possible. For example, the throttle angle at which the valve control system opens the EGR valve may be varied from the parameters set forth herein depending on the particular engine, installation, and emissions specifications. As was described above, the EGR system may be used with normally aspirated engines or supercharged engines (supercharged with either a mechanically driven supercharger or an exhaust driven turbosupercharger) as well as with engines used in a wide variety of applications.

In sum, then, it is contemplated that the inventive concepts herein described may be variously otherwise embodied and it is intended that the appended claims be construed to include alternative embodiments of the invention except insofar as limited by the prior art.

What is claimed is:

1. An exhaust gas recirculation system for an internal combustion engine, the internal combustion engine including an intake manifold and an exhaust manifold, comprising:

a first valve having an inlet end and an outlet end, the inlet end being connected to the exhaust manifold;

a heat exchanger having an inlet end and an outlet end, the inlet end of said heat exchanger being connected to the outlet end of said first valve;

a filter having an inlet end and an outlet end, the inlet end of said filter being connected to the outlet end of said heat exchanger, and the outlet end being connected to the intake manifold of the engine;

a valve control system connected to said first valve for selectively opening and closing said first valve, wherein cooled and filtered exhaust gases are recirculated into the intake manifold when said first valve is open; and an intermittent water injection system connected at about the inlet end of said heat exchanger for injecting into exhaust gases from the engine a predetermined quantity of water at periodic time intervals, wherein the predetermined quantity of water flashes to steam and creates a pressure pulse which dislodges solid particulate matter that has accumulated within said heat exchanger.

2. A method for recirculating exhaust gases produced by an internal combustion engine, the internal combustion engine having an intake manifold and an exhaust manifold, comprising the steps of:

cooling the exhaust gases in a heat exchanger to produce cooled exhaust gases;

filtering the cooled exhaust gases by passing them through a filter to produce cooled and filtered exhaust gases;

drawing from the filter an amount of cooled and filtered exhaust gases to be recirculated; and directing the cooled and filtered exhaust gases into the intake manifold.

3. An exhaust gas recirculation system for an internal combustion engine, the internal combustion engine including an intake manifold and an exhaust manifold, comprising:

- a water-cooled heat exchanger having an inlet end and an outlet end, the inlet end of said heat exchanger being connected to the exhaust manifold;
- a filter having an inlet end and an outlet end, the inlet end of said filter being connected to the outlet end of said heat exchanger, the outlet end being connected to the intake manifold;
- an intermittent water injection system connected at about the inlet end of said heat exchanger for injecting a predetermined quantity of water at periodic time intervals into exhaust gases from the engine;
- a first valve having an inlet end and an outlet end, the inlet end being connected to the outlet end of said filter; and
- a valve control system connected to said first valve for selectively opening and closing said first valve, wherein cooled and filtered exhaust gases are recirculated into the intake manifold when said first valve is open.

4. A method for recirculating exhaust gases produced by an internal combustion engine, the internal combustion engine having an intake manifold and an exhaust manifold comprising the steps of:

- drawing from the exhaust manifold only an amount of exhaust gases to be recirculated;
- oxidizing the exhaust gases to be recirculated by passing them over a catalyst;
- cooling the exhaust gases in a heat exchanger;
- filtering the exhaust gases by passing them through a filter; and
- directing the exhaust gases into the intake manifold.

5. The method of claim 4, wherein the exhaust gases are cooled to a temperature of about 300° F. before filtering the exhaust gases.

6. An exhaust gas recirculation system for an internal combustion engine, the internal combustion engine including an intake manifold and an exhaust manifold, comprising:

- a first valve having an inlet end and an outlet end, the inlet end being connected to the exhaust manifold;
- a heat exchanger having an inlet end and an outlet end, the inlet end of said heat exchanger being connected to the outlet end of said first valve;
- a filter having an inlet end and an outlet end, the inlet end of said filter being connected to the outlet end of said heat exchanger, and the outlet end being connected to the intake manifold of the engine;
- a valve control system connected to said first valve for selectively opening and closing said first valve, wherein cooled and filtered exhaust gases are recirculated into the intake manifold when said first valve is open;
- an intermittent water injection system connected at about the inlet end of said heat exchanger for injecting a predetermined quantity of water at periodic time intervals into exhaust gases from the engine; and
- a catalyst positioned between said first valve and said heat exchanger.

7. The exhaust gas recirculation system of claim 6, wherein said heat exchanger comprises a water cooled heat exchanger.

8. The exhaust gas recirculation system of claim 7, wherein said filter comprises:

- a filter housing; and
- a filter element positioned within said filter housing.

9. The exhaust gas recirculation system of claim 6, further comprising a second valve connected in parallel with said first valve, said second valve also being connected to said valve control system.

10. The exhaust gas recirculation system of claim 9, wherein said second valve is independently operable of said first valve, wherein said first valve and said second valve can be opened and closed independently of the other by said valve control system.

11. The exhaust gas recirculation system of claim 10, wherein said valve control system is responsive to changes in a position of a throttle valve associated with the engine and wherein said valve control system opens and closes said first and second valves in response to the position of the throttle valve.

12. The exhaust gas recirculation system of claim 11, wherein said intermittent water injection system comprises:

- a reservoir for containing a supply of water to be injected;
- an injector connected at about the inlet end of said heat exchanger; and
- a pump connected between said reservoir and said injector, said pump being adapted to pump water from said reservoir to said injector.

13. An exhaust gas recirculation system for an internal combustion engine, the internal combustion engine having an intake manifold and an exhaust manifold, comprising:

- a first valve having an inlet and an outlet, the inlet of said first valve being connected to the exhaust manifold of the internal combustion engine;
- a catalyst assembly having an inlet and an outlet, the inlet of said catalyst assembly being connected to the outlet of said first valve;
- a water-cooled heat exchanger having an inlet end and an outlet end, the inlet end of said heat exchanger being connected to the outlet of said catalyst assembly;
- a filter assembly having an inlet end and an outlet end, the inlet end of said filter assembly being connected to the outlet end of said heat exchanger, the outlet end of said filter assembly being connected to the intake manifold of the internal combustion engine;
- a valve control system connected to said first valve for opening and closing said first valve; and
- an intermittent water injection system associated with said heat exchanger, the intermittent water injection system having an reservoir for containing a supply of water, an injector mounted at about the inlet end of said heat exchanger, and a pump for pumping a quantity of water from the reservoir to the injector at predetermined intervals.

14. The exhaust gas recirculation system of claim 13, further comprising a second valve connected in parallel with said first valve, said second valve also being connected to said valve control system.

15. The exhaust gas recirculation system of claim 14, wherein said second valve is independently operable of said first valve, wherein said first valve and said second valve can be opened and closed independently of the other by said valve control system.

16. The exhaust gas recirculation system of claim 15, wherein said valve control system is responsive to changes in a position of a throttle valve associated with the engine and wherein said valve control system opens and closes said first and second valves in response to the position of the throttle valve.

* * * * *